Patented May 25, 1926.

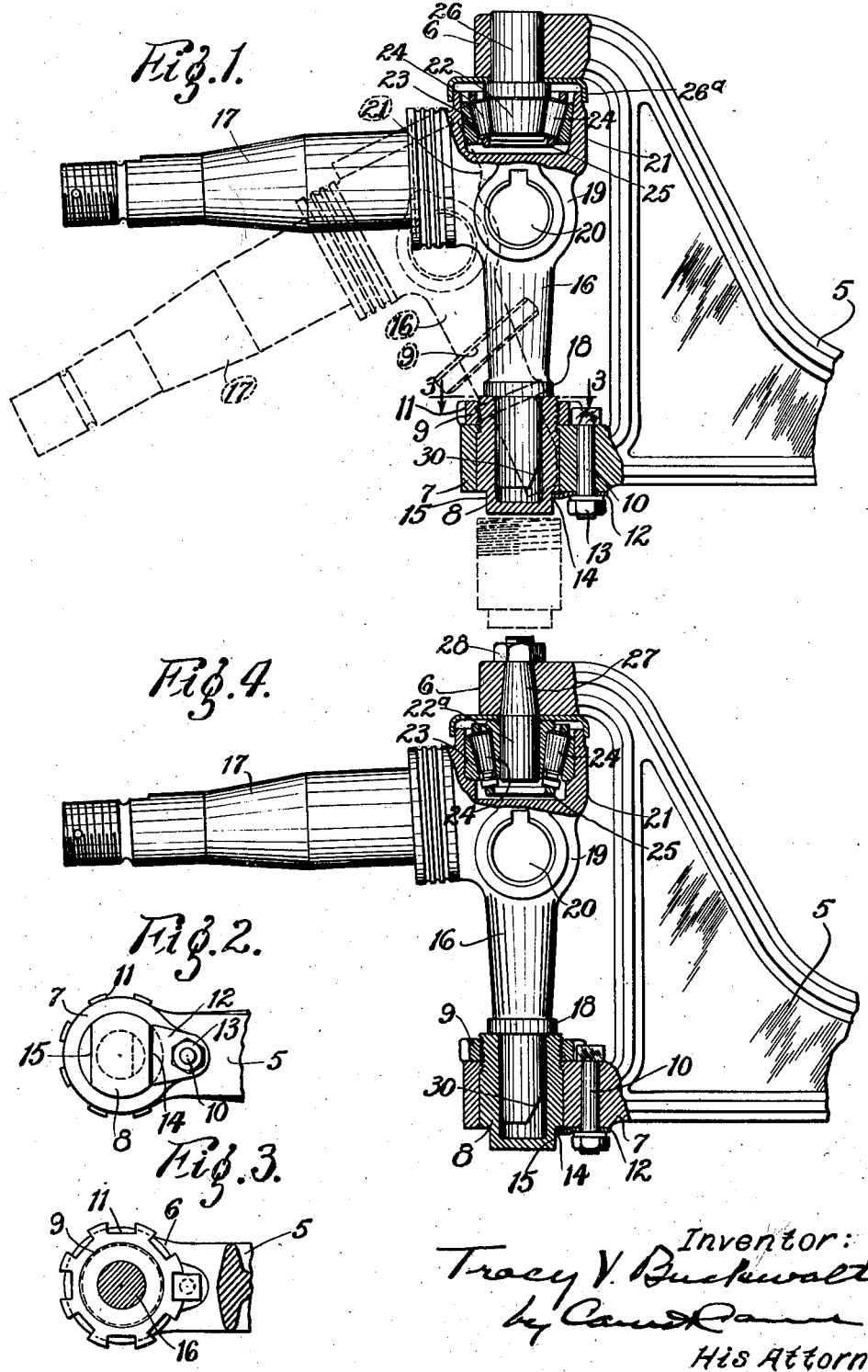

1,585,758

UNITED STATES PATENT OFFICE.

TRACY V. BUCKWALTER, OF CANTON, OHIO, ASSIGNOR TO THE TIMKEN ROLLER BEARING COMPANY, OF CANTON, OHIO, A CORPORATION OF OHIO.

STEERING-KNUCKLE CONSTRUCTION.

Application filed January 2, 1923. Serial No. 610,191.

This invention relates to anti-friction bearings for taking care of the radial and end thrust of steering knuckles for motor vehicles and has for its principal object to minimize friction, to provide for simplicity and cheapness of construction, to facilitate assembling, to provide for lubrication and to obtain other advantages. The invention consists in the parts and combinations of parts hereinafter described and claimed.

In the accompanying drawing, which forms part of this specification and wherein like symbols refer to like parts wherever they occur, Fig. 1 is an elevation, partly in section, of a steering knuckle construction embodying my invention;

Fig. 2 is a bottom plan view of the lower branch of the steering knuckle;

Fig. 3 is a horizontal section on the line 3—3 in Fig. 1;

Fig. 4 is a view similar to Fig. 1 showing a modified steering knuckle construction.

The axle 5, of which only one end is shown, has a forked steering head consisting of an upper branch 6 and a lower branch 7. Mounted in a vertical bore in the lower branch 6 of the steering head is a hardened steel bearing in the form of a bushing or cup 8 whose upper end is threaded externally to receive an adjusting nut 9. The adjusting nut 9 rests on the lower branch 7 of the steering head and serves as a support for the cup and as a means for adjusting said cup longitudinally of its axis. Extending vertically through the lower branch of the steering head, adjacent to the bearing cup 8 and the adjusting nut 9 therefor, is a bolt 10. The bolt 10 is disposed with its head portion uppermost and entered into any one of a series of notches 11 formed in the periphery of the adjusting nut 9, whereby said nut may be locked in the desired adjusted position. Likewise, rotation of the bearing cup 8 is prevented by means of a washer 12, which is held in position on the lower end of the bolt 10 by a nut 13 and is formed with a straight surface 14 adapted to cooperate with one or the other of a pair of oppositely disposed flat surfaces 15 formed on the lower end portion of the bearing cup 8.

The steering knuckle comprises a vertically disposed steering pivot portion 16, whose lower end portion is journaled in the bearing cup 8, and a laterally projecting spindle portion 17 on which the vehicle wheel (not shown) is mounted. A circumferential flange 18 of the steering pivot 16 abuts against the upper end of the bearing cup 8 and serves to space the lower end of the steering pivot away from the bottom of said cup. A boss 19 on said steering pivot 16 has a hole 20 therethrough provided with a keyway; and a rod (not shown) is keyed in this hole and is connected to the steering mechanism. The upper end of the steering knuckle pivot 16 is enlarged, as at 21, and provided with a tapered or conical recess or socket adapted to receive a conical or tapered anti-friction bearing comprising a cone or inner bearing member 22, a cup or outer bearing member 23 and conical bearing rollers 24 that are arranged in a circular series between said cup and said cone and retained in position by means of a suitable cage 25. The cone or inner bearing member has an integral stem portion 26 which has a press fit in a bore in the upper branch 6 of the steering head; and the cup or outer bearing member 23 is seated within the tapered or conical socket provided therefor in the enlarged upper end portion 21 of the steering knuckle pivot.

The bearing receiving socket or recess in the enlarged upper end portion 21 of the steering knuckle pivot 16 is adapted to receive oil which is retained therein by means of a cap in the form of a downwardly flanged disk 26 which is sleeved on the stem portion $22^a$ of the inner bearing cone 22 and overhangs the upper edge of said steering knuckle pivot. By this arrangement, the roller bearing is submerged in oil and requires but occasional attention.

In the construction shown in Fig. 4 the cone or inner bearing member $22^a$ of the tapered roller bearing for the upper end of the steering knuckle pivot 16 is shown fitted on the lower end of a pin 27 whose upper end is tapered to fit a tapered hole in the upper branch 6 of the steering head. The upper end of the pin 27 projects above the upper branch of the steering head and is threaded to receive a nut 28 which bears against the surface of said branch and is adapted to pull the tapered surface of the pin up against the tapered surface of the vertical bore or hole in the upper branch of the steering head.

In assembling the parts, the adjusting nut 9 is slipped over the steering knuckle pivot 16. The steering knuckle is then tilted (as shown in dotted lines in Fig. 1), thereby permitting the lower end of the steering knuckle pivot 16 to be inserted downwardly in the bore in the lower branch of the axle a distance sufficient to enable the upper end of said pivot to be swung to a position directly beneath the roller bearing. The steering knuckle pivot 16 may be beveled at its lower end 30 to facilitate the operation. The steering knuckle is then moved directly upward to cause the roller bearing to seat in the recess provided therefor in the enlarged upper end portion of the steering knuckle pivot. The bearing cup 8 is then placed in position and the adjusting nut 9 is threaded thereon and adjusted to bring the cup or outer bearing member into proper engagement with the bearing rollers. The bolt 10 and lock washer 12 are then placed in position and serve to lock the adjusting nut 9 and the bearing cup 8 against accidental rotation.

It is noted that the tapered roller bearing that supports the upper end of the steering knuckle pivot takes care of both the radial thrust due to the offset wheel and the end thrust due to the weight carried by said wheel. It is also noted as a very important advantage of my invention that this combined radial and thrust bearing may be quickly and easily adjusted to take up wear by manipulating the adjusting nut that supports the lower bearing cup.

Other advantages of the foregoing construction are: the elimination of the king pin or bolt, together with the fitting therefor, ordinarily used in steering knuckle construction; an oil tight closure for the roller bearing that insures proper lubrication of the bearing and protects the same from dust and grit; simplicity and cheapness of construction; and ease in assembling and in replacing the parts subject to wear.

It is evident that numerous changes may be made without departing from the invention; therefore, I do not wish to be limited to the precise construction shown and described.

What I claim is:

1. The combination with an axle of a roller bearing and a cup bearing mounted on said axle in axial alinement, a steering knuckle comprising a pivot portion having one end journaled in said cup bearing and having its other end recessed to receive said roller bearing, and a member supported on said axle and adjustably engaging said cup bearing, said member serving as a support for said cup bearing and as a means for adjusting the same longitudinally on its axis.

2. The combination with an axle of a roller bearing and a cup bearing supported on said axle in axial alinement, a steering knuckle comprising a pivot portion having its lower end journaled in said cup bearing and having its other end recessed to receive said roller bearing, a cap for said recess, said cup bearing comprising a cup vertically slidably mounted in the lower fork of said axle and having a screw thread on its outer surface and an interiorly threaded ring engaging said thread and arranged to bear against said lower fork, and means for locking said member in the desired adjusted position.

3. The combination with an axle of a roller bearing and a cup bearing mounted on said axle in axial alinement, a steering knuckle comprising a pivot portion having its lower end journaled in said cup bearing and having its other end recessed to receive said roller bearing, said cup bearing comprising a cup vertically slidably mounted in the lower fork of said axle and having a screw thread on its outer surface and an interiorly threaded ring engaging said thread and arranged to bear against said lower fork, and the pivot portion of said steering knuckle having a shouldered portion adapted to abut against the upper end of said cup and thereby space the lower end of said pivot portion away from the bottom of said cup.

4. The combination with an axle of a roller bearing and a cylindrical cup bearing supported on said axle in vertical axial alinement, a steering knuckle comprising a pivot portion having its lower end journaled in said cup bearing and having its upper end recessed to receive said roller bearing, said cup bearing comprising a cup vertically slidably mounted in the lower fork of said axle and having a screw thread on its outer surface and an interiorly threaded ring engaging said thread and arranged to bear against said lower fork, the pivot portion of said steering knuckle having a shouldered portion adapted to abut against the upper end of said cup and thereby space the lower end of said pivot portion away from the bottom of said cup, and means on said axle for preventing both independent and joint rotation of said cup bearing and the member threaded thereon.

5. In a steering axle construction wherein a steering knuckle is pivotally mounted on a fork of the axle, a cylindrical cup bearing for the lower part of the pivot portion of said knuckle, said cup bearing comprising a cup vertically slidably mounted in the lower fork of said axle and having its top portion threaded and a threaded ring thereon adapted to bear downwardly against the lower fork of said axle, whereby the turning of said ring serves to adjust said knuckle.

6. In a steering axle construction wherein a steering knuckle is pivotally mounted on a fork of the axle, a cylindrical cup bearing for the lower part of the pivot portion of said knuckle, said cup bearing comprising a cup vertically slidably mounted in the lower fork of said axle and having a screw thread on the upper portion of its outer surface and an interiorly threaded ring engaging said thread and arranged to bear downwardly against said lower fork, whereby the turning of said ring serves to adjust said knuckle and means for locking said member in the desired adjusted position.

7. In a steering axle construction wherein a steering knuckle is pivotally mounted on a fork of the axle, a cylindrical cup bearing for the lower part of the pivot portion of said knuckle, said cup bearing comprising a cup vertically slidably mounted in the lower fork of said axle and having a screw thread on the upper portion of its outer surface and an interiorly threaded ring engaging said thread and arranged to bear downwardly against said lower fork, whereby the turning of said ring serves to adjust said knuckle and the pivot portion of said steering knuckle having a shouldered portion adapted to abut against the upper end of said cup and thereby space the lower end of said pivot portion away from the bottom of said cup.

8. In a steering axle construction wherein a steering knuckle is pivotally mounted on a fork of the axle, a cylindrical cup bearing for the lower part of the pivot portion of said knuckle, said cup bearing comprising a cup vertically slidably mounted in the lower fork of said axle and having a screw thread on the upper portion of its outer surface and an interiorly threaded ring engaging said thread and arranged to bear downwardly against said lower fork, whereby the turning of said ring serves to adjust said knuckle the pivot portion of said steering knuckle having a shouldered portion adapted to abut against the upper end of said cup and thereby space the lower end of said pivot portion away from the bottom of said cup, and means on said axle for preventing both independent and joint rotation of said cup bearing and member threaded thereon.

Signed at Canton, Ohio, this 26th day of December, 1922.

TRACY V. BUCKWALTER.